United States Patent
Uchida et al.

(10) Patent No.: US 6,181,020 B1
(45) Date of Patent: Jan. 30, 2001

(54) INTEGRATED DRIVING TORQUE CONTROL SYSTEM FOR AUTOMOTIVE VEHICLES WITH CONTINUOUSLY VARIABLE AUTOMATIC TRANSMISSION

(75) Inventors: Masaaki Uchida, Kanagawa; Masayuki Yasuoka, Yokohama; Shusaku Katakura, Kanagawa, all of (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/325,795

(22) Filed: Jun. 4, 1999

(30) Foreign Application Priority Data

Jun. 4, 1998 (JP) ................................. 10-156126

(51) Int. Cl.$^7$ ................................ F02N 11/06; H02P 9/04
(52) U.S. Cl. .................. 290/40 C; 290/40 A; 290/40 B; 290/40 D; 290/40 E; 477/43; 477/47
(58) Field of Search ................. 290/40 A–40 F; 477/43, 47, 48, 46, 406; 701/51, 55, 56, 58

(56) References Cited

U.S. PATENT DOCUMENTS

| | | | |
|---|---|---|---|
| 5,947,861 | * | 9/1999 | Nobumoto et al. ..................... 477/37 |
| 6,054,844 | * | 4/2000 | Frank ....................................... 322/16 |
| 6,055,474 | * | 4/2000 | Adachi et al. .......................... 701/51 |
| 6,063,004 | * | 5/2000 | Ibamoto et al. ........................ 477/47 |
| 6,066,070 | * | 5/2000 | Ito et al. ................................. 477/43 |
| 6,083,138 | * | 7/2000 | Aoyama et al. .......................... 477/5 |
| 6,086,507 | * | 7/2000 | Juh .......................................... 477/48 |
| 6,090,007 | * | 7/2000 | Nakajima et al. ...................... 477/46 |

FOREIGN PATENT DOCUMENTS

| | | | |
|---|---|---|---|
| 62-110536 | 5/1987 | (JP) | ....................................... 290/40 |
| 7-172217 | 7/1995 | (JP) | ....................................... 290/40 |

* cited by examiner

Primary Examiner—Elvin Enad
(74) Attorney, Agent, or Firm—Foley & Lardner

(57) ABSTRACT

An integrated driving-torque control system for an automotive vehicle with a continuously variable automatic transmission (CVT) and an electronically-controlled engine, comprises a desired transmission ratio arithmetic-calculation circuitry calculating a required axle-driveshaft driving torque from an accelerator depression amount and a vehicle speed, and retrieving a desired transmission ratio on the basis of the required axle-driveshaft driving torque and the vehicle speed VSP. An electronic control unit (ECU) executes automatic shifting control for the CVT so that an actual transmission ratio is adjusted to the desired transmission ratio. A first arithmetic-calculation circuitry calculates a first desired engine output torque corresponding to the required axle-driveshaft driving torque, whereas a second arithmetic-calculation circuitry calculates a second desired engine output torque corresponding to the accelerator depression amount. A selector selects the first desired engine output torque as a desired engine output torque under a condition of VSP≧VSP$_S$ (a predetermined vehicle speed threshold), and selects the second desired engine output torque as the desired engine output torque under a condition of VSP<VSP$_S$. The ECU executes engine power output control for the engine in response to the desired engine output torque selected by the selector.

17 Claims, 3 Drawing Sheets

INTEGRATED DRIVING TORQUE CONTROL SYSTEM FOR AUTOMOTIVE VEHICLES WITH CONTINUOUSLY VARIABLE AUTOMATIC TRANSMISSION

BACKGROUND OF THE INVENTION

1. Field of the Invention

The present invention relates to an electronic driving-torque control system for an automotive vehicle with a continuously variable automatic transmission, often abbreviated to "CVT", in which a required driving torque to be applied to axle driveshafts or drive wheels is determined as a combination of the engine power output and the transmission ratio of the CVT, and specifically to a system capable of providing the enhanced accuracy of driving-torque control in a low-speed range as well as in mid- and high-speed ranges.

2. Description of the Prior Art

In continuously variable automatic transmissions such as a belt type continuously variable automatic transmission, a toroidal type continuously variable automatic transmission, or the like, a desired transmission ratio of the continuously variable automatic transmission (CVT) is first derived or determined depending on both vehicle speed and engine load, for automatic shifting control. Feedback control is then executed so that an actual transmission ratio is adjusted to the desired transmission ratio. During acceleration where the required engine load increases with the driver's accelerator pedal depression, an automatic downshifting operation is executed, so that the actual transmission ratio is adjusted toward near the lowest speed-change ratio with the desired transmission ratio automatically increasing. During driving at low engine loads with the accelerator pedal released, an automatic upshifting operation is executed, so that the actual transmission ratio is adjusted toward near the highest speed-change ratio with the desired transmission ratio automatically decreasing. Japanese Patent Provisional Publication No. 7-172217 discloses techniques for deriving a required driving torque value (a positive wheel torque value) based on both the vehicle speed and the accelerator-pedal depression amount. In recent years, the driving-torque control is often combined with the automatic shifting control as previously discussed, in order to enhance the accuracy of driving-torque control, accounting for better fuel economy. The integrated driving-torque control, in which the electronic engine power output control is integrated into the automatic shifting control, has been disclosed in Japanese Patent Provisional Publication No. 62-110536.

SUMMARY OF THE INVENTION

Figure 3:
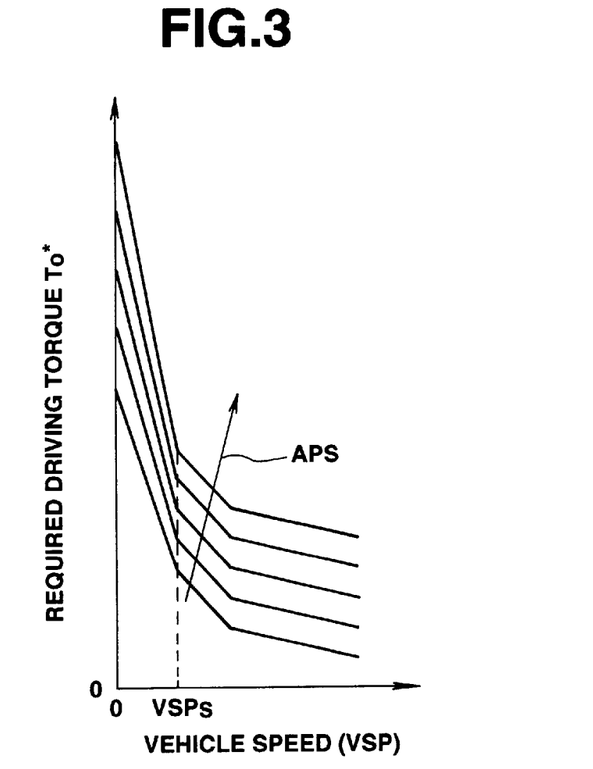
FIG. 3 is a required axle-driveshaft driving-torque characteristic map illustrating the relationship among the vehicle speed (VSP), the required driving torque ($T_o^*$), and the accelerator pedal depression amount (APS).
Figure 4:
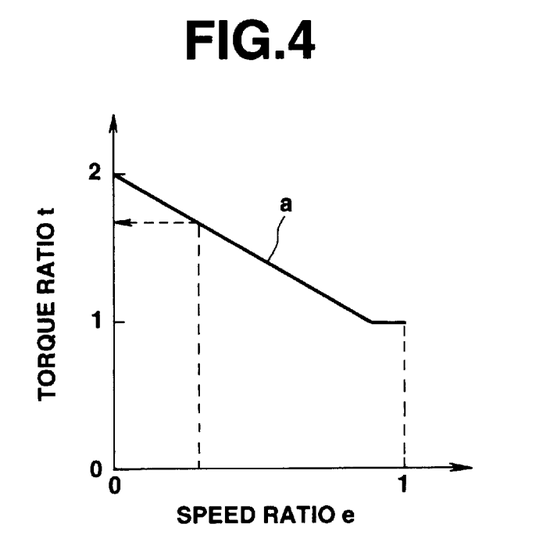
FIG. 4 shows a speed-ratio (e) versus torque-ratio (t) characteristic curve a in case that the releasable coupling device is a torque converter (preferably a lock-up torque converter).

In case of the integrated driving-torque control disclosed in the Japanese Patent Provisional Publication No. 62-110536, a required driving torque value is arithmetically calculated on the basis of both the vehicle speed and the accelerator pedal depression amount. For the automatic shifting control, an optimal fuel-consumption (an optimal fuel efficiency) dependent desired transmission ratio is arithmetically calculated on the basis of both the required driving torque value arithmetically calculated and the vehicle speed detected, so as to produce the required driving torque while attaining the lowest possible fuel consumption. On the other hand, for the electronic engine power output control, a desired engine power output value or a desired engine output torque value is arithmetically calculated on the basis of both the required driving torque value and an actual transmission ratio, and then a desired throttle opening is arithmetically calculated on the basis of the desired engine power output value and engine speed. As seen in FIG. 3, a rate of change of the required axle-driveshaft driving torque $T_o^*$ with respect to the vehicle speed VSP is usually preset or predetermined to become greater in the low-speed range rather than in the mid- and high-speed ranges, at any accelerator pedal depression amount APS, thus insuring driveability of the vehicle. In presence of errors in detection of the vehicle speed VSP during driving at low speeds, there would be great fluctuations of the required driving torque $T_o^*$ owing to the increased rate of change of required driving torque $T_o^*$ with respect to the vehicle speed VSP in the low speed ranges. The presence of an error in detection of the vehicle speed in the low speed range reduces the accuracy in calculation of the required driving torque $T_o^*$. Additionally, in the low speed range, a releasable coupling device such as a torque converter is often conditioned in a transient state, thus producing an increased error in calculation or derivation of a desired engine power output value (a desired engine output torque value) from the required driving torque $T_o^*$. It is desirable to enhance the accuracy of driving-torque control in a low-speed range as well as in mid- and high-speed ranges in automotive vehicles with a continuously variable automatic transmission.

Accordingly, it is an object of the invention to provide a driving-torque control system for automotive vehicles with a continuously variable automatic transmission, which avoids the aforementioned disadvantages of the prior art.

It is another object of the invention to provide a driving-torque control system for an automotive vehicle combined with a continuously variable automatic transmission, which is capable of enhancing the accuracy of driving-torque control even in a low speed range as well as mid- and high-speed ranges.

In order to accomplish the aforementioned and other objects of the present invention, an integrated driving-torque control system for an automotive vehicle with a continuously variable automatic transmission and an electronically-controlled engine whose power output is changeable irrespective of depression of an accelerator pedal, comprises a desired transmission ratio arithmetic-calculation circuitry calculating a required axle-driveshaft driving torque from a depression amount of the accelerator pedal and a vehicle speed, and retrieving a desired transmission ratio on the basis of the required axle-driveshaft driving torque and the vehicle speed, an automatic shifting control section executing automatic shifting control for the continuously variable automatic transmission so that an actual transmission ratio is adjusted to the desired transmission ratio, a first arithmetic-calculation circuitry calculating a first desired engine output torque corresponding to the required axle-driveshaft driving torque, a second arithmetic-calculation circuitry calculating a second desired engine output torque corresponding to the depression amount of the accelerator pedal, a selector selecting the first desired engine output torque as a desired engine output torque when the vehicle speed is equal to or greater than a predetermined vehicle speed threshold, and selecting the second desired engine output torque as the desired engine output torque when the vehicle speed is less than the predetermined vehicle speed threshold, and an engine power output control section executing engine power output control for the electronically-controlled engine in response to the desired engine output torque selected by the selector.

According to another aspect of the invention, an integrated driving-torque control system for an automotive vehicle with a continuously variable automatic transmission and an electronically-controlled engine whose power output is changeable irrespective of depression of an accelerator pedal, comprises means for retrieving a required axle-driveshaft driving torque on the basis of a depression amount of the accelerator pedal and a vehicle speed, from a predetermined required axle-driveshaft driving-torque characteristic map, means for calculating a desired transmission ratio on the basis of the required axle-driveshaft driving torque and the vehicle speed by reference to a predetermined desired transmission ratio characteristic map, automatic shifting control means for executing automatic shifting control for the continuously variable automatic transmission so that an actual transmission ratio is adjusted to the desired transmission ratio, first arithmetic-calculation means for calculating a first desired engine output torque corresponding to the required axle-driveshaft driving torque, second arithmetic-calculation means for calculating a second desired engine output torque corresponding to the depression amount of the accelerator pedal, selection means for selecting the first desired engine output torque as a desired engine output torque to be generated from the electronically-controlled engine when the vehicle speed is equal to or greater than a predetermined vehicle speed threshold, and selecting the second desired engine output torque as the desired engine output torque to be generated from the electronically-controlled engine when the vehicle speed is less than the predetermined vehicle speed threshold, and engine power output control means for executing engine power output control for the electronically-controlled engine in response to the desired engine output torque selected by the selection means. It is preferable that the predetermined vehicle speed threshold is preset to a lower limit of a vehicle speed range within which there is a less rate of change in the desired engine output torque with respect to the vehicle speed and there is less problem of a reduced accuracy of driving-torque control, caused by fluctuations in the required axle-driveshaft driving torque which fluctuations occur due to an error in detection of the vehicle speed.

According to a further aspect of the invention, a method for controlling axle-driveshaft driving torque for an automotive vehicle with a continuously variable automatic transmission and an electronically-controlled engine whose power output is changeable irrespective of depression of an accelerator pedal, the method comprises calculating a required axle-driveshaft driving torque from a depression amount of the accelerator pedal and a vehicle speed, retrieving a desired transmission ratio on the basis of the required axle-driveshaft driving torque and the vehicle speed, executing automatic shifting control for the continuously variable automatic transmission so that an actual transmission ratio is adjusted to the desired transmission ratio, calculating a first desired engine output torque corresponding to the required axle-driveshaft driving torque, calculating a second desired engine output torque corresponding to the depression amount of the accelerator pedal, setting a desired engine output torque at the first desired engine output torque when the vehicle speed is equal to or greater than a predetermined vehicle speed threshold, setting the desired engine output torque at the second desired engine output torque when the vehicle speed is less than the predetermined vehicle speed threshold, executing engine power output control for the electronically-controlled engine in response to the desired engine output torque set to either the first desired engine output torque or the second desired engine output torque.

According to a still further aspect of the invention, a method for controlling axle-driveshaft driving torque for an automotive vehicle with a continuously variable automatic transmission and an electronically-controlled engine whose power output is changeable irrespective of depression of an accelerator pedal, the method comprises retrieving a required axle-driveshaft driving torque on the basis of a depression amount of the accelerator pedal and a vehicle speed, from a predetermined required axle-driveshaft driving-torque characteristic map, calculating a desired transmission ratio on the basis of the required axle-driveshaft driving torque and the vehicle speed by reference to a predetermined desired transmission ratio characteristic map, executing automatic shifting control for the continuously variable automatic transmission so that an actual transmission ratio is adjusted to the desired transmission ratio, calculating a first desired engine output torque corresponding to the required axle-driveshaft driving torque, calculating a second desired engine output torque corresponding to the depression amount of the accelerator pedal, selecting the first desired engine output torque as a desired engine output torque to be generated from the electronically-controlled engine when the vehicle speed is equal to or greater than a predetermined vehicle speed threshold, selecting the second desired engine output torque as the desired engine output torque to be generated from the electronically-controlled engine when the vehicle speed is less than the predetermined vehicle speed threshold, executing engine power output control for the electronically-controlled engine in response to the desired engine output torque selected.

DESCRIPTION OF THE PREFERRED EMBODIMENTS

Figure 1:
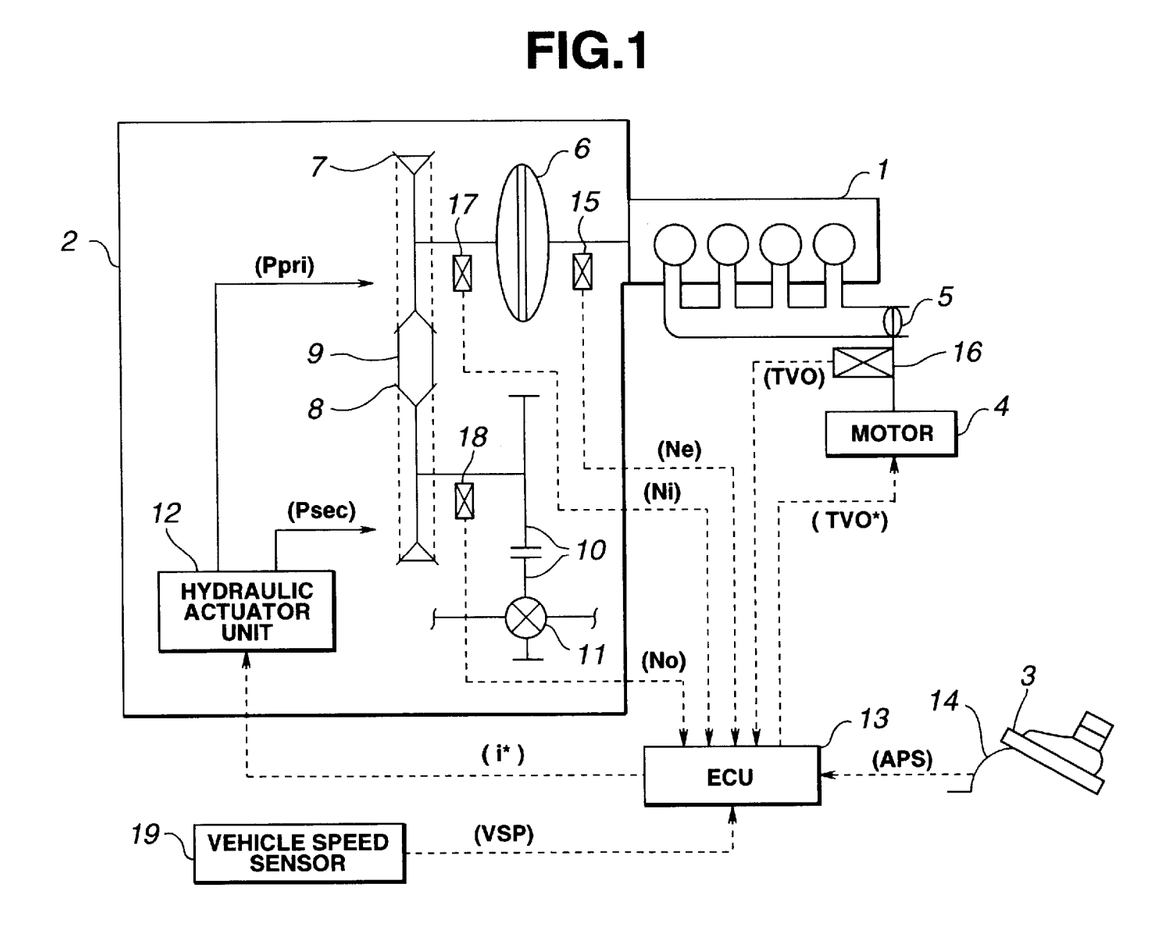
FIG. 1 is a system diagram illustrating one embodiment of a driving-torque control system of an automotive vehicle with a continuously variable automatic transmission.

Referring now to the drawings, particularly to FIG. 1, the integrated driving-torque control system of the invention is exemplified in an automotive vehicle equipped with an inline four-cylinder gasoline engine 1 mated to a continuously variable automatic transmission (CVT) combined with a torque converter 6. In the shown embodiment, a belt-type continuously variable automatic transmission 2 is used as the CVT. Engine power output or output torque from the engine 1 can be electronically controlled, irrespective of depression of the accelerator pedal, as detailed hereinbelow. The engine 1 is equipped with an electronically-controlled throttle 5 whose opening (i.e., the flow rate of intake air entering each intake-valve port) is electronically controlled by means of a so-called throttle motor 4, independently of a depression amount or an operating amount of an accelerator pedal operated by the driver. The throttle motor 4 usually comprises a stepper motor (also known as a "stepping motor" or a "step-servo motor"). The throttle motor 4 of the electronically-controlled throttle 5 is connected via a signal line to the output interface (or a drive circuit) of an electronic control module (ECM) or an electronic control unit (ECU) 13, so that the angular steps or essentially uniform angular movements of the motor 4 can be obtained electromagnetically depending on a control signal (or a drive signal) which is output from the output interface of the control unit 13 and indicative of a desired throttle opening TVO*. The belt-type continuously variable transmission 6, has primary and secondary—driving and driven—pulleys 7 and 8 whose effective diameters are continuously changeable. The primary pulley is often called an "input pulley", whereas the secondary pulley is often called an "output pulley". The belt-type CVT has a segmented steel belt 9 wound on both the primary and secondary pulleys 7 and 8. The output shaft (i.e., crankshaft) of the engine 1 is connected to the primary pulley 7 via a torque-converter (preferably a so-called lock-up torque converter) or an electromagnetic clutch, and therefore power output of the engine 1 is transmitted to the secondary pulley by the segmented steel belt 9. The secondary pulley 8 has a drive-connection with a differential 11 via a final gear set 10 to transmit driving torque (or positive wheel torque) to axle driveshafts or drive wheels. Although it is not clearly shown, a line pressure is suitably compensated or regulated as a secondary pulley actuation pressure $P_{sec}$ by means of a line-pressure control system involving a plurality of valves. Then, the regulated line pressure is fed into a driven-pulley hydraulic actuator included in a hydraulic actuator unit or a hydraulic modulator unit 12. In more detail, the primary pulley 7 comprises a stationary conical flange and an adjustable conical flange or a movable flange to form a V-shaped groove and consequently to form a variable width pulley 7. The movable flange of the primary pulley is slidably connected onto the central shaft of the stationary flange by means of linear ball bearing splines (not shown for the purpose of illustrative simplicity), in a manner so as to prevent relative rotation of the movable flange to the stationary flange and at the same time to permit axial sliding movement of the movable flange relative to the stationary flange. In the same manner, the secondary pulley 8 comprises a stationary conical flange and an adjustable conical flange or a movable flange to form a V-shaped groove and to form a variable width pulley 8. The movable flange of the secondary pulley 8 is slidably connected onto the central shaft of the stationary flange by means of linear ball bearing splines (not shown), in a manner so as to prevent relative rotation of the movable flange to the stationary flange and at the same time to permit axial sliding movement of the movable flange relative to the stationary flange. A so-called speed-change control pressure is produced by further regulating the properly regulated line pressure at a designated pressure level. The speed-change control pressure, often called a "primary pressure", is fed via a control pressure line into a driving-pulley hydraulic actuator included in the hydraulic actuator unit 12 as a primary pulley actuation pressure $P_{pri}$. As clearly seen in FIG. 1, the speed-change control pressure or the primary pulley actuation pressure $P_{pri}$ is applied to the movable flange of the primary pulley 7, so that the movable flange moves toward the stationary flange, whereas the compensated line pressure, that is, the secondary pulley actuation pressure $P_{sec}$, is applied to the movable flange of the secondary pulley 8, so that the movable flange moves toward the stationary flange. In a conventional manner, the axial position of the primary-pulley movable flange is controlled by the regulated line pressure in a primary pulley actuation cylinder of the driving-pulley hydraulic actuator. On the other hand, the axial position of the secondary-pulley movable flange is controlled by way of the coil spring bias plus speed-change control pressure in a smaller-diameter secondary pulley actuation cylinder of the driven-pulley hydraulic actuator. Usually, a pressure-receiving area of the primary-pulley movable flange receiving the primary pulley actuation pressure $P_{pri}$ is designed to be two-times greater than that of the secondary-pulley movable flange receiving the secondary pulley actuation pressure $P_{sec}$. With the previously-noted arrangement, the effective diameters of the primary and secondary pulleys 7 and 8 are continuously changeable in response to the differential pressure between the secondary pulley actuation pressure (simply a secondary pressure) $P_{sec}$ and the primary pulley actuation pressure (simply a primary pressure) $P_{pri}$. As discussed above, the speed-change ratio or the transmission ratio of the CVT can be continuously varied within certain limits, depending on the previously-noted differential pressure. The differential pressure between the primary and secondary pressures is determined by a control signal value or a control command which is output from the output interface of the ECU 13 to the hydraulic actuator unit 12 and representative of a desired transmission ratio i*. Actually, both of the primary-pulley movable flange and the secondary-pulley movable flange can shift depending on the primary pressure $P_{pri}$ and the secondary pressure $P_{sec}$ output from the hydraulic actuator unit 12 whose output pressures ($P_{pri}$, $P_{sec}$) are modulated in response to the control signal reflecting the desired transmission ratio i*. This enables the actual transmission ratio of the CVT 2 to be steplessly adjusted or feedback-controlled toward the desired transmission ratio i*. The previously-noted desired throttle opening TVO* of the electronically-controlled throttle 5 and the desired transmission ratio i* are arithmetically calculated by the processor (CPU or MPU) containing an arithmetic and logic section employed in the ECU 13. The arithmetic calculations for the control signal values TVO* and i* will be hereinbelow described in detail by reference to data and control signal flow indicated in the form of the block diagram shown in FIG. 2.

Figure 2:
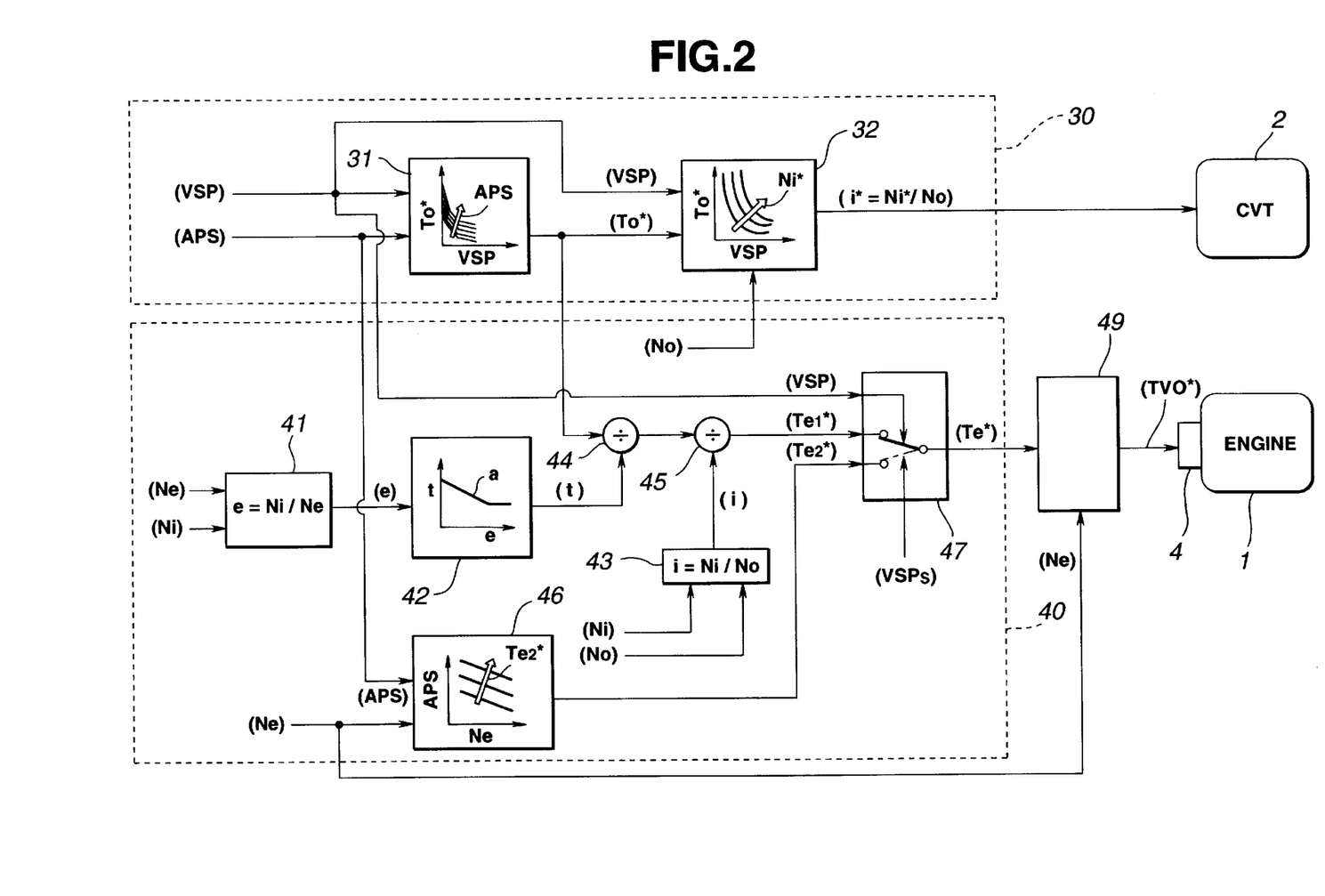
FIG. 2 is a block diagram explaining the improved integrated driving-torque control in which electronic engine power output control (achieved by virtue of an electronically-controlled throttle 5 plus throttle motor 4) is integrated into automatic shifting control (achieved by virtue of a hydraulic actuator unit 12).

In order to perform electronic engine power output control integrated into automatic shift operation (or automatic speed-change control of the CVT), the input interface of the control unit 13 receives various signals (APS, $N_e$, TVO, $N_i$, $N_o$, VSP) from engine/vehicle sensors, namely an accelerator position sensor 14, a crank angle sensor 15, a throttle opening sensor 16, a transmission input-shaft speed sensor 17, a transmission output-shaft speed sensor 18, and a vehicle speed sensor 19. The accelerator position sensor 14 is provided to detect a depression amount of an accelerator pedal 3 (or an angular position of the accelerator pedal or an operating amount of the accelerator pedal). The crank angle sensor 15 is provided to detect engine speed $N_e$ of the engine 1. As can be appreciated from the location of the sensor 15 shown in FIG. 1, the engine-speed indicative signal from the crank angle sensor 15 actually corresponds to an input shaft rotational speed of the torque converter 6. The throttle opening sensor 16 is provided to generate a throttle-opening sensor signal indicative of a throttle opening TVO which is generally defined as a ratio of an actual throttle angle of the throttle 5 to a throttle angle obtained at wide open throttle. The transmission input-shaft speed sensor (or the primary-pulley rotational speed sensor) 17 is generally located near the flanged portion of the primary pulley 7, to detect the transmission input-shaft rotational speed $N_i$. The transmission input-shaft rotational speed $N_i$ detected by the sensor 17 corresponds to an output-shaft rotational speed of the torque converter 6. Similarly, the transmission output-shaft speed sensor (or the secondary-pulley rotational speed sensor) 18 is generally located near the flanged portion of the secondary pulley 8 to detect the transmission output-shaft rotational speed $N_o$. The vehicle speed sensor 19 is provided to detect the vehicle speed VSP. As can be seen from the block diagram of FIG. 2, in order for the driving-torque control system of the embodiment to execute the integrated driving-torque control (that is, a combination of the automatic speed-change control for the CVT 2 and the throttle opening control for the engine 1 equipped with the electronically-controlled throttle 5), the control unit 13, first of all, extracts the input informational data, namely the more recent vehicle speed data VSP, the more recent accelerator depression amount data APS, the more recent engine speed date $N_e$, the more up-to-date transmission input-shaft speed data $N_i$, and the more up-to-date transmission output-shaft speed data $N_o$. FIG. 2 shows a block diagram of the system of the embodiment, necessary for estimating or arithmetically calculating the desired transmission ratio i* for the automatic shifting control of the CVT 2, and for estimating or arithmetically calculating the desired engine output torque TVO* for the electronic engine power output control of the engine 1 with the electronically-controlled throttle 5.

Referring now to FIG. 2, reference sign 30 denotes a desired transmission ratio (i*) arithmetic-calculation block or a desired transmission ratio arithmetic-calculation circuitry, whereas reference sign 40 denotes a desired engine output torque (TVO*) arithmetic-calculation block or a desired engine output torque arithmetic-calculation circuitry. Firstly explained is the desired transmission ratio (i*) arithmetic-calculation block 30 (see the upper block indicated by the broken line of FIG. 2). The desired transmission ratio arithmetic-calculation block 30 comprises a required axle-driveshaft driving torque arithmetic-calculation section (or a required axle-driveshaft driving torque arithmetic-calculation circuitry) 31 and a desired transmission ratio arithmetic-calculation section (or a desired transmission ratio arithmetic-calculation circuitry) 32. The required axle-driveshaft driving torque arithmetic-calculation section 31 is designed to retrieve a required axle-driveshaft driving torque (simply a required driving torque $T_o$*) on the basis of both the accelerator depression amount data APS from the sensor 14 and the vehicle speed data VSP from the sensor 19, from the predetermined or preprogrammed required axle-driveshaft driving-torque characteristic map shown in FIG. 3. Subsequently to the arithmetic calculation executed by the required axle-driveshaft driving torque arithmetic-calculation section 31, the desired transmission ratio arithmetic-calculation section 32 retrieves a desired transmission input-shaft rotational speed $N_i$* on the basis of both the required driving torque $T_o$* and the vehicle speed data VSP, from a predetermined or preprogrammed desired transmission ratio (i*) characteristic map showing the relationship among the vehicle speed VSP, the required driving torque $T_o$*, and the desired transmission input-shaft rotational speed $N_i$*. In the shown embodiment, the characteristic map shown in the arithmetic-calculation section 32 of FIG. 2 is designed to obtain optimal transmission input-shaft rotational speed more suitable to generate the required driving torque To* with the lowest possible fuel consumption at the latest up-to-date vehicle speed data VSP. Then, the desired transmission ratio arithmetic-calculation section 32 arithmetically calculates or derives a desired transmission ratio i* on the basis of both the desired transmission input-shaft rotational speed $N_i$* retrieved and the transmission output-shaft rotational speed $N_o$ detected by the sensor 18, from a predetermined expression $i^* = N_i^*/N_o$. Thereafter, the output interface of the control unit 13 generates a control signal or a drive signal corresponding to the desired transmission ratio i* to the hydraulic actuator unit 12 of the CVT 2 to operate the driving-pulley hydraulic actuator and the driven-pulley hydraulic actuator both included in the hydraulic actuator unit 12, so that the transmission input-shaft rotational speed is adjusted toward the desired value $N_i$*. In this manner, the ECU 13 containing the input/output interface and the desired transmission ratio arithmetic-calculation circuitry 30 functions as an automatic shifting control section for the CVT 2. Secondarily explained is the desired engine output torque (TVO*) arithmetic-calculation block 40 (see the lower block indicated by the broken line of FIG. 2). The desired engine output torque arithmetic-calculation block 40 comprises a speed-ratio arithmetic-calculation section 41, a torque-ratio arithmetic-calculation section 42, a transmission-ratio arithmetic-calculation section 43, a first divider 44, a second divider 45, a second desired engine-output-torque arithmetic-calculation section 46, and a desired engine-output-torque selector 47. The previously-noted speed-ratio arithmetic section 41 arithmetically calculates or derives a speed ratio e on the basis of both the engine speed data $N_e$ (the input-shaft rotational speed of the torque converter 6) detected by the sensor 15 and the transmission input-shaft rotational speed $N_i$ (the output-shaft rotational speed of the torque converter 6) detected by the sensor 17, from a predetermined expression $e = N_i/N_e$. In the shown embodiment, the torque converter 6 is exemplified as a releasable coupling device, and thus the torque-ratio arithmetic-calculation section 42 retrieves a torque ratio t on the basis of the speed ratio e calculated by the arithmetic-calculation section 41, utilizing the predetermined or preprogrammed speed-ratio versus torque-ratio characteristic curve a suitable for the torque-converter-equipped engine. The transmission-ratio arithmetic-calculation section 43 arithmetically calculates an actual transmission ratio i, which is defined as a ratio of the transmission input-shaft rotational speed $N_i$ to the transmission output-shaft rotational speed $N_o$, by the expression $i = N_i/N_o$. The first divider 44 is designed to derive a desired input-shaft torque ($T_o$*/t) of the CVT 2 by dividing the required axle-driveshaft driving torque $T_o$* by the torque ratio t. The second divider 45 is designed to derive a first desired engine output torque ($T_{e1}^* = (T_o^*/t)/i = (T_o^*/t) \times (N_o/N_i)$) by dividing the desired input-shaft torque ($T_o$*/t) by the transmission ratio i (=$N_i/N_o$). As may be appreciated, the first and second dividers 44 and 45 cooperate with each other to compute the first desired engine output torque ($T_{e1}^* = (T_o^*/t)/i$). Thus, the divider pair (44, 45) can be referred to as a "first desired engine-output-torque arithmetic-calculation section" or a "first desired engine-output-torque arithmetic-calculation circuitry". On the other hand, the second desired engine-output-torque arithmetic-calculation section (or the second desired engine-output-torque arithmetic-calculation circuitry) 46 is provided to retrieve a second desired engine output torque $T_{e2}$* on the basis of both the accelerator depression amount data APS and the engine speed data $N_e$, from a predetermined or preprogrammed accelerator-pedal-position dependent desired engine-output-torque characteristic map shown in the second desired engine-output-torque arithmetic-calculation section 46 of FIG. 2. The desired engine-output-torque selector 47 is also provided to select the first desired engine output torque value $T_{e1}$* out of the first and second desired engine output torque values $T_{e1}$* and $T_{e2}$*, and to generate an output signal indicative of the first desired engine output torque $T_{e1}^*$ as a final desired engine output torque $T_e^*$, when the vehicle speed VSP is equal to or greater than a preset vehicle speed or a predetermined vehicle speed threshold $VSP_s$. Conversely, when the vehicle speed VSP is less than the preset vehicle speed $VSP_s$, the desired engine-output-torque selector 47 selects the second desired engine output torque value $T_{e2}^*$ out of the first and second desired engine output torque values $T_{e1}^*$ and $T_{e2}^*$, and to generate an output signal indicative of the second desired engine output torque $T_{e2}^*$ as the final desired engine output torque $T_e^*$. In this manner, the ECU 13 containing the input/output interface and the desired engine-output-torque arithmetic-calculation circuitry 40 also functions as an electronic engine power output control section for the electronically-controlled engine 1. From the viewpoint of optimal setting of the predetermined vehicle speed threshold $VSP_s$, as seen in FIG. 3, the vehicle speed threshold $VSP_s$ is preset or preprogrammed to a lower limit of a vehicle speed range within which there is a less rate of change in the desired engine output torque (the final engine output torque) $T_e^*$ with respect to the vehicle speed VSP, and thus there is no or less problem (no or less risk) of the reduced accuracy of driving-torque control, caused by fluctuations in the required axle-driveshaft driving torque $T_o^*$, that is, deterioration of driveability of the vehicle, occurring owing to an error in detection of the vehicle speed VSP. Informational data signal indicative of the previously-discussed desired engine output torque $T_e^*$, selected or determined by the desired engine output torque selector 47, is input into a desired throttle-opening arithmetic-calculation section 49. The throttle-opening arithmetic-calculation section 49 computes a desired throttle opening TVO* required to produce the desired engine output torque $T_e^*$, on the basis of both the desired engine output torque $T_e^*$ selected by the section 47 and the engine speed data $N_e$. Thereafter, the throttle-opening arithmetic-calculation section 49 generates an output signal (a control signal or a drive signal corresponding to the desired throttle opening TVO*) to operate the throttle motor 4, so that the opening of the electronically-controlled throttle 5 is adjusted to the desired throttle opening TVO*.

As discussed above, in the system of the embodiment, the required axle-driveshaft driving torque $T_o^*$ is arithmetically calculated from both the accelerator depression amount data APS and the vehicle speed data VSP, and the desired transmission ratio i* is derived from both the required axle-driveshaft driving torque $T_o^*$ and the vehicle speed VSP. Then, the automatic shifting control of the CVT 2 is made so that the actual transmission ratio of the CVT is adjusted toward the desired transmission ratio i*. Additionally, in case that the more up-to-date vehicle speed data VSP is equal to or greater than the predetermined vehicle speed threshold $VSP_s$, that is, in case of $VSP \geq VSP_s$, the electronic engine output torque control (or the electronic engine power output control of the engine 1 or the electronic throttle opening control of the throttle 5) is executed in such a manner as to generate the first desired engine output torque $T_{e1}^*$ corresponding to the required axle-driveshaft driving torque $T_o^*$. That is to say, by virtue of a combination of the electronic engine power output control of the engine 1 and the automatic shifting control of the CVT 2, it is possible to achieve the designated integrated driving-torque control that the required axle-driveshaft driving torque $T_o^*$ is realized with the lowest possible fuel consumption at the vehicle speed indicative information data sampled. In contrast to the above, in case that the more up-to-date vehicle speed data VSP is less than the predetermined vehicle speed threshold $VSP_s$, that is, in case of $VSP < VSP_s$, the electronic engine output torque control is executed in such a manner as to generate the second desired engine output torque $T_{e2}^*$ corresponding to the accelerator depression amount data APS, in lieu of the first desired engine output torque $T_{e1}^*$. Therefore, in the low-speed range where there are great fluctuations in the required axle-driveshaft driving torque $T_o^*$ (i.e., the deteriorated driveability), occurring due to an error in detection of the vehicle speed VSP and thus the accuracy of driving-torque control may be lowered, the electronic engine power output control is executed so that the actual engine output torque is adjusted toward the accelerator-pedal depression (APS) dependent second desired engine output torque value $T_{e2}^*$. Thus, the electronic engine power output control can be unaffected by an error in detection of the vehicle speed VSP in the low-speed range, thus avoiding the problem of deteriorated driveability even in the low-speed range within which a rate of change of the required axle-driveshaft driving torque $T_o^*$ with respect to the vehicle speed VSP is preset to a comparatively great value (see a relatively steep gradient of the required axle-driveshaft driving-torque characteristic curve of FIG. 3 in the low-speed range).

In the shown embodiment, actually, the electronic engine power output control is attained by electronically controlling or adjusting the throttle opening TVO of the throttle 5. Such an electronic engine power output control based on the electronic throttle-opening control is useful in a gasoline engine mated to a CVT. Alternatively, the integrated driving-torque control system of the invention is applicable to a diesel engine with an electronic fuel injection system. In this case, that is, in a diesel engine mated to a CVT, the electronic diesel-engine power output control can be attained by electronically controlling or adjusting a fuel injection amount in place of the throttle opening TVO, since the diesel-engine output torque value is in proportion to the fuel injection amount.

In order to ensure the more smooth switching operation between the first and second desired engine output torque values $T_{e1}^*$ and $T_{e2}^*$, it is preferable that the desired engine-output-torque selector 47 is designed to realize a smooth transition between the first and second desired engine output torque values $T_{e1}^*$ and $T_{e2}^*$ in time series, as discussed hereunder.

In the presence of transition from the state of $VSP < VSP_s$ to the state of $VSP \geq VSP_s$, the desired engine-output-torque selector 47 operates to switch the desired engine output torque $T_e^*$ from the second desired engine output torque $T_{e2}^*$ to the first desired engine output torque $T_{e1}^*$ in time series, in accordance with the following expression.

$$T_e^* = (1-K) \cdot T_{e2}^* + K \cdot T_{e1}^*$$

where K is a coefficient varying (increasing) linearly from 0 to 1 for a predetermined period of time.

Conversely, in the presence of transition from the state of $VSP \geq VSP_s$ to the state of $VSP < VSP_s$, the desired engine-output-torque selector 47 operates to switch the desired engine output torque $T_e^*$ from the first desired engine output torque $T_{e1}^*$ to the second desired engine output torque $T_{e2}^*$ in time series, in accordance with the following expression.

$$T_e^* = (1-K) \cdot T_{e1}^* + K \cdot T_{e2}^*$$

That is to say, the desired engine-output-torque selector 47 comprises a comparator for comparing the vehicle speed (VSP) with the predetermined vehicle speed threshold ($VSP_s$) and a gain controller smoothly switching between the first desired engine output torque ($T_{e1}*$) and the second desired engine output torque ($T_{e2}*$) for the predetermined period of time. In other words, in the presence of transition from a state where the vehicle speed (VSP) is less than the predetermined vehicle speed threshold ($VSP_S$) to a state where the vehicle speed (VSP) is equal to or greater than the predetermined vehicle speed threshold ($VSP_S$) the gain controller operates to linearly increase the first desired engine output torque ($T_{e1}*$) with a control gain K increasing linearly from 0 to 1 for the predetermined period of time and operates to linearly decrease the second desired engine output torque ($T_{e2}*$) with a control gain (1−K) decreasing linearly from 1 to 0 for the predetermined period of time. In the presence of transition from the state where the vehicle speed (VSP) is equal to or greater than the predetermined vehicle speed threshold ($VSP_S$) to the state where the vehicle speed (VSP) is less than the predetermined vehicle speed threshold ($VSP_S$), the gain controller operates to linearly decrease the first desired engine output torque ($T_{e1}*$) with the control gain (1−K) decreasing linearly from 1 to 0 for the predetermined period of time and operates to linearly increase the second desired engine output torque ($T_{e2}*$) with the control gain (K) increasing linearly from 0 to 1 for the predetermined period of time. The desired engine output torque selected by the selector 47 is obtained as the sum of the first desired engine output torque ($T_{e1}*$) and the second desired engine output torque ($T_{e2}*$) linearly varying for the predetermined period of time.

As can be appreciated from the aforementioned two expressions, the desired engine-output-torque selector 47 can ensure more smooth switching between the first and second desired engine output torque values $T_{e1}*$ and $T_{e2}*$ for the previously-noted predetermined time period, irrespective of the direction of transition from the first desired engine output torque values $T_{e1}*$ to $T_{e2}*$ and vice versa, thus avoiding undesirable power train shock occurring due to the torque difference between the first and second desired engine output torque values $T_{e1}*$ and $T_{e2}*$.

The contents of Application No. TOKUGANHEI 10-156126, filed Jun. 4, 1998, in Japan is hereby incorporated by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An integrated driving-torque control system for an automotive vehicle with a continuously variable automatic transmission and an electronically-controlled engine whose power output is changeable irrespective of depression of an accelerator pedal, comprising:
    a desired transmission ratio arithmetic-calculation circuitry calculating a required axle-driveshaft driving torque from a depression amount of the accelerator pedal and a vehicle speed, and retrieving a desired transmission ratio on the basis of the required axle-driveshaft driving torque and the vehicle speed;
    an automatic shifting control section executing automatic shifting control for the continuously variable automatic transmission so that an actual transmission ratio is adjusted to the desired transmission ratio;
    a first arithmetic-calculation circuitry calculating a first desired engine output torque corresponding to the required axle-driveshaft driving torque;
    a second arithmetic-calculation circuitry calculating a second desired engine output torque corresponding to the depression amount of the accelerator pedal;
    a selector selecting the first desired engine output torque as a desired engine output torque when the vehicle speed is equal to or greater than a predetermined vehicle speed threshold, and selecting the second desired engine output torque as the desired engine output torque when the vehicle speed is less than the predetermined vehicle speed threshold; and
    an engine power output control section executing engine power output control for the electronically-controlled engine in response to the desired engine output torque selected by said selector.

2. The integrated driving-torque control system as claimed in claim 1, wherein the predetermined vehicle speed threshold ($VSP_S$) is preset to a lower limit of a vehicle speed range within which there is a less rate of change in the desired engine output torque with respect to the vehicle speed and there is less problem of a reduced accuracy of driving-torque control, caused by fluctuations in the required axle-driveshaft driving torque which fluctuations occur due to an error in detection of the vehicle speed.

3. The integrated driving-torque control system as claimed in claim 1, wherein the electronically-controlled engine is a gasoline engine having an electronically-controlled throttle, and said engine power output control section executes the engine power output control by electronically controlling a throttle opening of the electronically-controlled throttle.

4. The integrated driving-torque control system as claimed in claim 1, wherein the electronically-controlled engine is a diesel engine having an electronic fuel injection system, and said engine power output control section executes the engine power output control by electronically controlling a fuel injection amount of the electronic fuel injection system.

5. The integrated driving-torque control system as claimed in claim 1, which further comprises a releasable coupling device disposed between the electronically-controlled engine and the continuously variable automatic transmission, and wherein said first arithmetic-calculation section arithmetically calculates the first desired engine output torque ($T_{e1}*$) from the required axle-driveshaft driving torque ($T_o*$), a transmission ratio (i) of the continuously variable automatic transmission, and a torque ratio (t) of the releasable coupling device.

6. The integrated driving-torque control system as claimed in claim 1, wherein said second arithmetic-calculation section arithmetically calculates the second desired engine output torque ($T_{e2}*$) from the depression amount (APS) of the accelerator pedal and an engine speed ($N_e$).

7. The integrated driving-torque control system as claimed in claim 1, wherein said selector performs a smooth switching operation between the first desired engine output torque ($T_{e1}*$) and the second desired engine output torque ($T_{e2}*$) for a predetermined period of time.

8. The integrated driving-torque control system as claimed in claim 7, wherein, in presence of transition from a state where the vehicle speed (VSP) is less than the predetermined vehicle speed threshold ($VSP_S$) to a state where the vehicle speed (VSP) is equal to or greater than the predetermined vehicle speed threshold ($VSP_S$), said selector operates to switch the desired engine output torque from the second desired engine output torque ($T_{e2}*$) to the first desired engine output torque ($T_{e1}*$) in time series, in accordance with an expression $T_e^* = (1-K) \cdot T_{e2}^* + K \cdot T_{e1}^*$, where K is a coefficient increasing linearly from 0 to 1 for the predetermined period of time, and in presence of transition from the state where the vehicle speed (VSP) is equal to or greater than the predetermined vehicle speed threshold ($VSP_S$) to the state where the vehicle speed (VSP) is less than the predetermined vehicle speed threshold ($VSP_S$), said selector operates to switch the desired engine output torque from the first desired engine output torque ($T_{e1}^*$) to the second desired engine output torque ($T_{e2}^*$) in time series, in accordance with an expression $T_e^* = (1-K) \cdot T_{e1}^* + K \cdot T_{e2}^*$.

9. An integrated driving-torque control system for an automotive vehicle with a continuously variable automatic transmission and an electronically-controlled engine whose power output is changeable irrespective of depression of an accelerator pedal, comprising:
   means for retrieving a required axle-driveshaft driving torque ($T_o^*$) on the basis of a depression amount (APS) of the accelerator pedal and a vehicle speed (VSP), from a predetermined required axle-driveshaft driving-torque characteristic map;
   means for calculating a desired transmission ratio (i*) on the basis of the required axle-driveshaft driving torque ($T_o^*$) and the vehicle speed (VSP) by reference to a predetermined desired transmission ratio characteristic map;
   automatic shifting control means for executing automatic shifting control for the continuously variable automatic transmission so that an actual transmission ratio (i) is adjusted to the desired transmission ratio (i*);
   first arithmetic-calculation means for calculating a first desired engine output torque ($T_{e1}^*$) corresponding to the required axle-driveshaft driving torque ($T_o^*$);
   second arithmetic-calculation means for calculating a second desired engine output torque ($T_{e2}^*$) corresponding to the depression amount (APS) of the accelerator pedal;
   selection means for selecting the first desired engine output torque ($T_{e1}^*$) as a desired engine output torque ($T_e^*$) to be generated from the electronically-controlled engine when the vehicle speed (VSP) is equal to or greater than a predetermined vehicle speed threshold ($VSP_S$)* and selecting the second desired engine output torque ($T_{e2}^*$) as the desired engine output torque ($T_e^*$) to be generated from the electronically-controlled engine when the vehicle speed (VSP) is less than the predetermined vehicle speed threshold ($VSP_S$); and
   engine power output control means for executing engine power output control for the electronically-controlled engine in response to the desired engine output torque ($T_e^*$) selected by said selection means.

10. The integrated driving-torque control system as claimed in claim 9, which further comprises a releasable coupling device disposed between the electronically-controlled engine and the continuously variable automatic transmission, and wherein said first arithmetic-calculation means comprises a first divider (44) deriving a desired input-shaft torque ($T_o^*/t$) of the continuously variable automatic transmission by dividing the required axle-driveshaft driving torque ($T_o^*$) by a torque ratio (t) of the releasable coupling device, and a second divider (45) deriving the first desired engine output torque ($T_{e1}^* = (T_o^*/t)/i$) by dividing the desired input-shaft torque ($T_o^*/t$) by the actual transmission ratio (i).

11. The integrated driving-torque control system as claimed in claim 9, wherein said second arithmetic-calculation means retrieves the second desired engine output torque ($T_{e2}^*$) on the basis of the depression amount (APS) of the accelerator pedal and an engine speed ($N_e$), from a predetermined accelerator-pedal-position dependent desired engine-output-torque characteristic map.

12. The integrated driving-torque control system as claimed in claim 9, wherein said selection means comprises a comparator for comparing the vehicle speed (VSP) with the predetermined vehicle speed threshold ($VSP_S$) and a gain controller smoothly switching between the first desired engine output torque ($T_{e1}^*$) and the second desired engine output torque ($T_{e2}^*$) for a predetermined period of time.

13. The integrated driving-torque control system as claimed in claim 12, wherein, in presence of transition from a state where the vehicle speed (VSP) is less than the predetermined vehicle speed threshold ($VSP_S$) to a state where the vehicle speed (VSP) is equal to or greater than the predetermined vehicle speed threshold ($VSP_S$), said gain controller operates to linearly increase the first desired engine output torque ($T_{e1}^*$) with a control gain K increasing linearly from 0 to 1 for the predetermined period of time and operates to linearly decrease the second desired engine output torque ($T_{e2}^*$) with a control gain (1−K) decreasing linearly from 1 to 0 for the predetermined period of time, and in presence of transition from the state where the vehicle speed (VSP) is equal to or greater than the predetermined vehicle speed threshold ($VSP_S$) to the state where the vehicle speed (VSP) is less than the predetermined vehicle speed threshold ($VSP_S$), said gain controller operates to linearly decrease the first desired engine output torque ($T_{e1}^*$) with the control gain (1−K) decreasing linearly from 1 to 0 for the predetermined period of time and operates to linearly increase the second desired engine output torque ($T_{e2}^*$) with the control gain (K) increasing linearly from 0 to 1 for the predetermined period of time, and wherein the desired engine output torque selected by said selection means is obtained as a sum of the first desired engine output torque ($T_{e1}^*$) and the second desired engine output torque ($T_{e2}^*$) linearly varying for the predetermined period of time.

14. The integrated driving-torque control system as claimed in claim 9, wherein the predetermined vehicle speed threshold ($VSP_S$) is preset to a lower limit of a vehicle speed range within which there is a less rate of change in the desired engine output torque ($T_e^*$) with respect to the vehicle speed (VSP) and there is less problem of a reduced accuracy of driving-torque control, caused by fluctuations in the required axle-driveshaft driving torque ($T_o^*$) which fluctuations occur due to an error in detection of the vehicle speed.

15. A method for controlling axle-driveshaft driving torque for an automotive vehicle with a continuously variable automatic transmission and an electronically-controlled engine whose power output is changeable irrespective of depression of an accelerator pedal, the method comprising:
   calculating a required axle-driveshaft driving torque ($T_o^*$) from a depression amount (APS) of the accelerator pedal and a vehicle speed (VSP);
   retrieving a desired transmission ratio (i*) on the basis of the required axle-driveshaft driving torque ($T_o^*$) and the vehicle speed (VSP);
   executing automatic shifting control for the continuously variable automatic transmission so that an actual transmission ratio (i) is adjusted to the desired transmission ratio (i*);
   calculating a first desired engine output torque ($T_{e1}^*$) corresponding to the required axle-driveshaft driving torque ($T_o^*$);

calculating a second desired engine output torque ($T_{e2}$*) corresponding to the depression amount (APS) of the accelerator pedal;

setting a desired engine output torque ($T_e$*) at the first desired engine output torque ($T_{e1}$*) when the vehicle speed (VSP) is equal to or greater than a predetermined vehicle speed threshold ($VSP_S$);

setting the desired engine output torque ($T_e$*) at the second desired engine output torque ($T_{e2}$*) when the vehicle speed (VSP) is less than the predetermined vehicle speed threshold ($VSP_S$);

executing engine power output control for the electronically-controlled engine in response to the desired engine output torque ($T_e$*) set to either the first desired engine output torque ($T_{e1}$*) or the second desired engine output torque ($T_{e2}$*).

16. A method for controlling axle-driveshaft driving torque for an automotive vehicle with a continuously variable automatic transmission and an electronically-controlled engine whose power output is changeable irrespective of depression of an accelerator pedal, the method comprising:

retrieving a required axle-driveshaft driving torque ($T_o$*) on the basis of a depression amount (APS) of the accelerator pedal and a vehicle speed (VSP), from a predetermined required axle-driveshaft driving-torque characteristic map;

calculating a desired transmission ratio (i*) on the basis of the required axle-driveshaft driving torque ($T_o$*) and the vehicle speed (VSP) by reference to a predetermined desired transmission ratio characteristic map;

executing automatic shifting control for the continuously variable automatic transmission so that an actual transmission ratio (i) is adjusted to the desired transmission ratio (i*);

calculating a first desired engine output torque ($T_{e1}$*) corresponding to the required axle-driveshaft driving torque ($T_o$*);

calculating a second desired engine output torque ($T_{e2}$*) corresponding to the depression amount (APS) of the accelerator pedal;

selecting the first desired engine output torque ($T_{e1}$*) as a desired engine output torque ($T_e$*) to be generated from the electronically-controlled engine when the vehicle speed (VSP) is equal to or greater than a predetermined vehicle speed threshold ($VSP_S$);

selecting the second desired engine output torque ($T_{e2}$*) as the desired engine output torque ($T_e$*) to be generated from the electronically-controlled engine when the vehicle speed (VSP) is less than the predetermined vehicle speed threshold ($VSP_S$);

executing engine power output control for the electronically-controlled engine in response to the desired engine output torque ($T_e$*) selected.

17. The method as claimed in claim 16, which further comprises smoothly switching between the first desired engine output torque ($T_{e1}$*) and the second desired engine output torque ($T_{e2}$*) for a predetermined period of time, so that, in presence of transition from a state where the vehicle speed (VSP) is less than the predetermined vehicle speed threshold ($VSP_S$) to a state where the vehicle speed (VSP) is equal to or greater than the predetermined vehicle speed threshold ($VSP_S$), the desired engine output torque is switched from the second desired engine output torque ($T_{e2}$*) to the first desired engine output torque ($T_{e1}$*) in time series, in accordance with an expression $T_e$*=(1−K)·$T_{e2}$*+K·$T_{e1}$*, where K is a coefficient increasing linearly from 0 to 1 for the predetermined period of time, and so that, in presence of transition from the state where the vehicle speed (VSP) is equal to or greater than the predetermined vehicle speed threshold (VSPS) to the state where the vehicle speed (VSP) is less than the predetermined vehicle speed threshold ($VSP_S$), the desired engine output torque is switched from the first desired engine output torque ($T_{e1}$*) to the second desired engine output torque ($T_{e2}$*) in time series, in accordance with an expression $T_e$*=(1−K)·$T_{e1}$*+K·$T_{e2}$*.

* * * * *